United States Patent
Kuwabara

(10) Patent No.: US 11,700,165 B2
(45) Date of Patent: Jul. 11, 2023

(54) DEVICE AND METHOD FOR CONTROLLING NETWORK

(71) Applicant: FUJITSU LIMITED, Kawasaki (JP)

(72) Inventor: Takashi Kuwabara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 17/029,620

(22) Filed: Sep. 23, 2020

(65) Prior Publication Data
US 2021/0111944 A1      Apr. 15, 2021

(30) Foreign Application Priority Data
Oct. 10, 2019   (JP) ................... 2019-186512

(51) Int. Cl.
| H04L 41/06 | (2022.01) |
| H04L 45/02 | (2022.01) |
| H04L 45/24 | (2022.01) |
| H04L 41/0654 | (2022.01) |

(52) U.S. Cl.
CPC ......... H04L 41/0654 (2013.01); H04L 45/02 (2013.01); H04L 45/24 (2013.01)

(58) Field of Classification Search
CPC ............ H04L 41/0654; H04L 41/0663; H04L 41/0806; H04L 45/02; H04L 45/24
See application file for complete search history.

(56) References Cited

U.S. PATENT DOCUMENTS

| 7,644,134 | B2 * | 1/2010 | Cohen ................... | G06F 16/958 709/218 |
| 7,698,148 | B2 * | 4/2010 | Lavu ................... | G06Q 10/0635 705/347 |
| 2003/0131130 | A1 * | 7/2003 | Malkosh ............. | H04L 12/5692 709/238 |
| 2003/0161309 | A1 * | 8/2003 | Karuppiah ............. | H04L 45/54 370/392 |
| 2005/0089027 | A1 * | 4/2005 | Colton ............... | H04Q 11/0005 370/380 |
| 2006/0268681 | A1 * | 11/2006 | Raza ....................... | H04L 45/02 370/216 |

(Continued)

FOREIGN PATENT DOCUMENTS

WO   2017/170103 A1   10/2017

Primary Examiner — Hassan A Phillips
Assistant Examiner — Hicham B Foud
(74) Attorney, Agent, or Firm — Fujitsu Patent Center

(57) ABSTRACT

A network control device includes a storage and a processor. The storage stores an identifying value and a severity value for each of network elements. The identifying values are hierarchized based on inclusion relationships between the network elements. The severity values respectively indicate a severity in sharing a risk of a failure in the network elements. When first and second paths are designated, the processor detects, for each of a plurality of target identifying values corresponding to a plurality of network elements implementing the first path, a longest matched identifying value having a longest region matching the target identifying value from among a plurality of identifying values corresponding to a plurality of network elements implementing the second path. The processor calculates a sum of severity values corresponding to the detected longest matched identifying values, and evaluates the second path for the first path based on the sum.

7 Claims, 16 Drawing Sheets

(56) References Cited

U.S. PATENT DOCUMENTS

| | | | |
|---|---|---|---|
| 2008/0049609 A1* | 2/2008 | Chao | H04L 12/66 370/218 |
| 2008/0232347 A1* | 9/2008 | Chao | H04L 45/50 370/351 |
| 2013/0242996 A1* | 9/2013 | Varvello | H04L 67/327 370/392 |
| 2016/0359642 A1* | 12/2016 | Song | H04L 12/6418 |
| 2018/0316595 A1* | 11/2018 | Jiang | H04L 45/14 |
| 2019/0097917 A1 | 3/2019 | Iizawa et al. | |

* cited by examiner

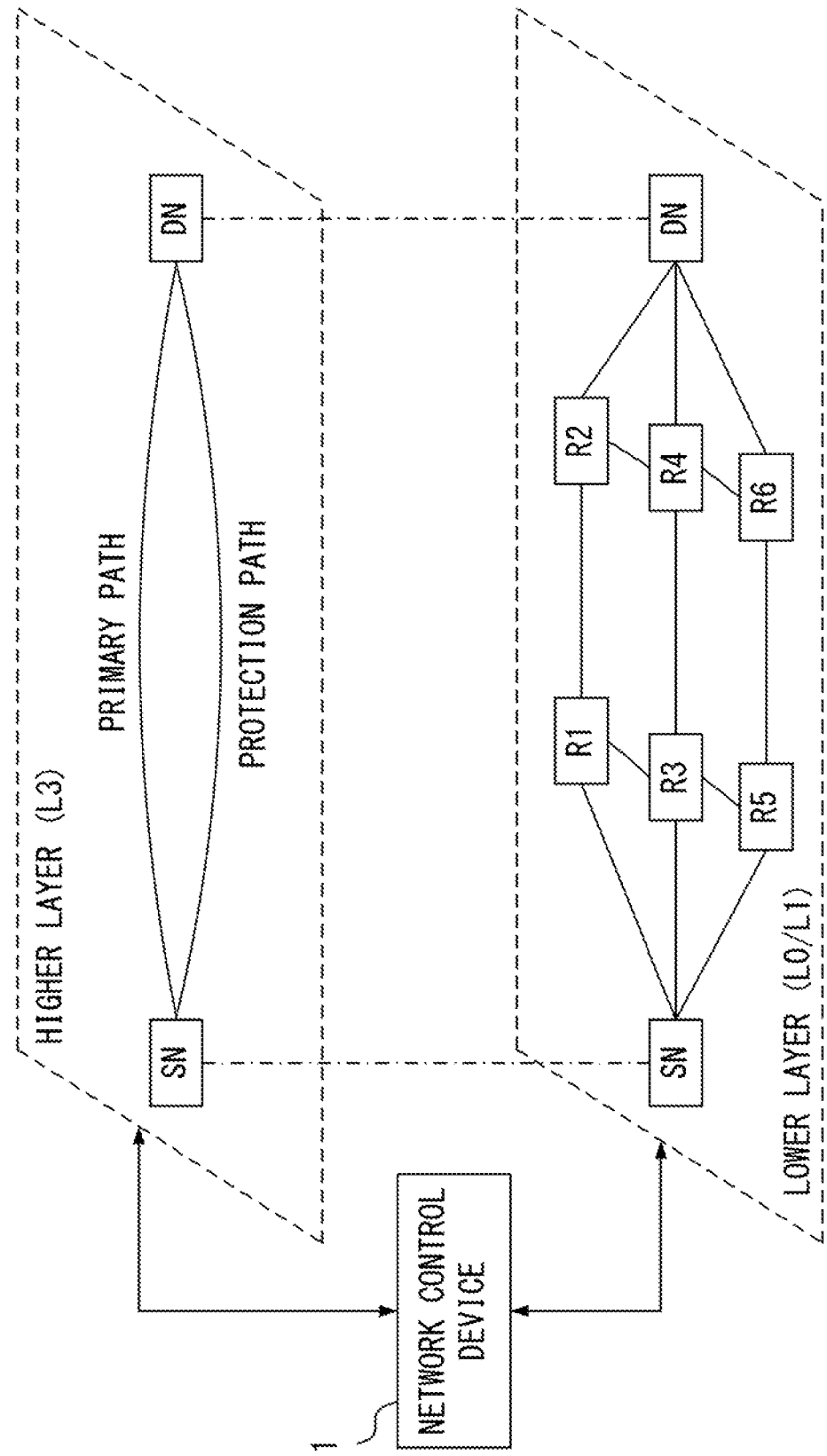
F I G. 1

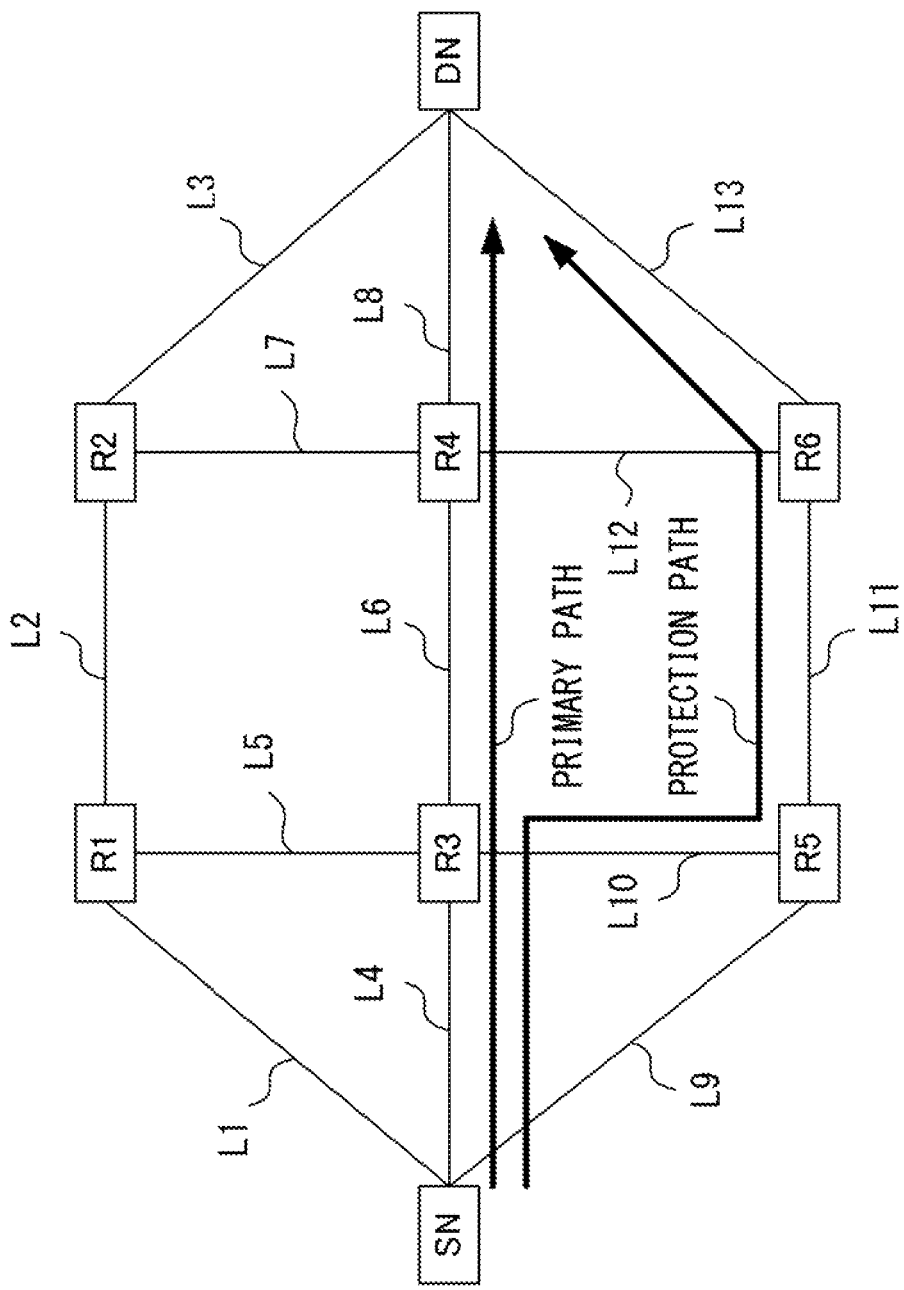
F I G. 2

```
0        7        15       23       31
```

| HIERARCHIZED SRLG |

| TYPE MASK |

| CLASS #1 MASK |

| CLASS #2 MASK |

| CLASS #3 MASK |

F I G. 4

| NETWORK ELEMENT | | | | SRLG VALUE | SEVERITY |
|---|---|---|---|---|---|
| TRANSMISSION LINE L4 | | | | 1010 1011 1100 1101 1101/16 | 10 |
| | CABLE 01 | | | 1010 1011 1100 1101 0000 0001/24 | 20 |
| | | FIBER 01 | | 1010 1011 1100 1101 0000 0001 0000 001/31 | 40 |
| | | | C BAND | 1010 1011 1100 1101 0000 0001 0000 0010/32 | 50 |
| | | | L BAND | 1010 1011 1100 1101 0000 0001 0000 0011/32 | 50 |
| | | FIBER 02 | | 1010 1011 1100 1101 0000 0001 0000 010/31 | 40 |
| | ... | | | | |
| | CABLE 02 | | | 1010 1011 1100 1101 0000 0010/24 | 20 |
| | ... | | | | |
| ROADM_R3 | | | | 1111 1110 1101 1100/16 | 10 |
| ... | | | | | |

F I G. 5

<PRIMARY PATH>

| NETWORK ELEMENT | SRLG VALUE | SEVERITY |
|---|---|---|
| TRANSMISSION LINE L4 | 1010 1011 1100 1101 0000 0001 0000 0010 | 10 (16), 20 (24), 40 (31), 50 (32) |
| ROADM_R3 | 1111 1110 1101 1100 1010 1000 0011 0000 0101 | 10 (16), 20 (20), 30 (24), 40 (28), 50 (32) |
| TRANSMISSION LINE L6 | 1010 1011 1101 0101 1100 1001 1100 0010 | 10 (16), 20 (24), 40 (31), 50 (32) |
| ROADM_R4 | 1111 1110 0001 0000 1110 1011 0011 0101 | 10 (16), 20 (20), 30 (24), 40 (28), 50 (32) |
| TRANSMISSION LINE L8 | 1010 1011 0111 1110 1101 1101 0100 1010 | 10 (16), 20 (24), 40 (31), 50 (32) |

<PROTECTION PATH>

| NETWORK ELEMENT | SRLG VALUE | SEVERITY |
|---|---|---|
| TRANSMISSION LINE L4 | 1010 1011 1100 1101 0000 0001 1010 0010 | 10 (16), 20 (24), 40 (31), 50 (32) |
| ROADM_R3 | 1111 1110 1101 1100 0101 1011 0100 0101 | 10 (16), 20 (20), 30 (24), 40 (28), 50 (32) |
| TRANSMISSION LINE L10 | 1010 1011 1110 0000 1110 1100 1101 0100 1010 | 10 (16), 20 (24), 40 (31), 50 (32) |
| ROADM_R5 | 1111 1110 1101 1101 0110 0010 1111 1011 1101 | 10 (16), 20 (20), 30 (24), 40 (28), 50 (32) |
| TRANSMISSION LINE L11 | 1010 1011 1111 0010 0101 1001 0110 1010 | 10 (16), 20 (24), 40 (31), 50 (32) |
| ROADM_R6 | 1111 1110 1001 1110 1010 0011 1011 0101 | 10 (16), 20 (20), 30 (24), 40 (28), 50 (32) |
| TRANSMISSION LINE L13 | 1010 1011 0001 0010 0101 0111 0101 1010 | 10 (16), 20 (24), 40 (31), 50 (32) |

F I G. 7

<PRIMARY PATH>

| NETWORK ELEMENT | SRLG VALUE | SEVERITY |
|---|---|---|
| TRANSMISSION LINE I4 | 1010 1011 1100 1101 0000 0001 0000 0010 | TYPE : 1010 |
| ROADM_R3 | 1111 1110 1101 1100 1010 0011 0000 0101 | TYPE : 1111 |
| TRANSMISSION LINE L6 | 1010 1011 0101 1100 1100 1001 1100 0010 | TYPE : 1010 |
| ROADM_R4 | 1111 1110 0001 0000 1110 1011 0011 0101 | TYPE : 1111 |
| TRANSMISSION LINE L8 | 1010 1011 0111 1110 1101 1101 0100 1010 | TYPE : 1010 |

<PROTECTION PATH>

| NETWORK ELEMENT | SRLG VALUE | SEVERITY |
|---|---|---|
| TRANSMISSION LINE L4 | 1010 1011 1100 1101 0000 0001 1010 0010 | TYPE : 1010 |
| ROADM_R3 | 1111 1110 1101 1100 0101 1011 0100 0101 | TYPE : 1111 |
| TRANSMISSION LINE L10 | 1010 1011 0000 1110 1100 1101 0100 1010 | TYPE : 1010 |
| ROADM_R5 | 1111 1110 1101 0110 0010 1111 1011 1101 | TYPE : 1111 |
| TRANSMISSION LINE L11 | 1010 1011 1111 0010 0101 1001 0110 1010 | TYPE : 1010 |
| ROADM_R6 | 1111 1110 1001 1110 1010 0011 1011 0101 | TYPE : 1111 |
| TRANSMISSION LINE L13 | 1010 1011 0001 0010 0101 0111 0101 1010 | TYPE : 1010 |

| TYPE | SEVERITY |
|---|---|
| 1010 | 10 (16), 20 (24), 40 (31), 50 (32) |
| 1111 | 10 (16), 20 (20), 30 (24), 40 (28), 50 (32) |
| ⋮ | |

| SRLG Type ||||
|---|---|---|---|
| Type Mask | # of Classes (n) | Class #1 Mask | Class #1 Severity |
| ⋮ ||||
| Class #n Mask | Class #n Severity | | |

FIG. 11B

| SRLG Type (0x A000 0000) ||||
|---|---|---|---|
| Type Mask (4) | # of Classes (4) | C#1 Mask (16) | C#1 Severity (10) |
| C#2 Mask (24) | C#2 Severity (20) | C#3 Mask (31) | C#3 Severity (40) |
| C#4 Mask (32) | C#4 Severity (50) | | |

FIG. 11C

| SRLG Type (0x F000 0000) ||||
|---|---|---|---|
| Type Mask (4) | # of Classes (5) | C#1 Mask (16) | C#1 Severity (10) |
| C#2 Mask (20) | C#2 Severity (20) | C#3 Mask (24) | C#3 Severity (30) |
| C#4 Mask (28) | C#4 Severity (40) | C#5 Mask (32) | C#3 Severity (50) |

<UPPER LIMIT>

| Object-Class (6) | OT (1) | Res | P | I | Object Length (12) |
|---|---|---|---|---|---|
| Reserved | | | | | Flags | C | B | Metric Type (T) |
| metric-value | | | | | |

<OPTIMIZED INDEX>

| Object-Class (21) | OT (1) | Res | P | I | Object Length (variable) |
|---|---|---|---|---|---|
| OF Code | | | | | Reserved |
| Optional TLVs | | | | | |

F I G. 1 2

DEVICE AND METHOD FOR CONTROLLING NETWORK

CROSS-REFERENCE TO RELATED APPLICATION

This application is based upon and claims the benefit of priority of the prior Japanese Patent Application No. 2019-186512, filed on Oct. 10, 2019, the entire contents of which are incorporated herein by reference.

FIELD

The embodiments discussed herein are related to a device and a method for controlling a network.

BACKGROUND

In recent years, multilayer networks have been put into practical use to meet various requirements pertaining to communications. A multilayer network includes a plurality of layers (or hierarchies). Networks belonging to each layer are built on the same physical network. The networks belonging to each layer may be configured in topologies logically different from each other.

In the meantime, redundancy configurations (or pass protections) have also been put into practical use to enhance tolerance to network failures. A redundancy configuration is implemented by establishing a primary path and a protection path between a source node and a destination node. Communications are performed via the primary path in normal times. Communications are performed via the protection path when a failure occurs in the primary path. Thus, the primary path and the protection path will preferably be established using resources physically different from each other as much as possible.

Shared risk link group (SRLG) has been proposed as one technique to be used to establish an appropriate protection path for a primary path. An SRLG indicates a link group having the likelihood of a failure occurring concurrently in a primary path and a protection path due to the sharing of a physical resource (physical constituent element). SRLGs are each assigned a specific value (hereinafter, "SRLG value"). For example, different SRLG values may be assigned to communication devices provided in a node, and different SRLG values may be assigned to cables or optical fibers. When establishing paths between a source node and a destination node, for example, a primary path and a protection path may be determined such that SRLG values corresponding to links to be used by the protection path does not match any of the SRLG values corresponding to links to be used by the primary path. Thus, a risk of concurrent occurrence of a failure in both the primary path and the protection path is reduced. A proposed method is one for establishing, in a multilayer network, an appropriate protection route in a higher layer in consideration of a backup configuration in a lower layer (e.g., International Publication Pamphlet No. WO 2017/170103).

However, complicated calculations need to be performed to determine redundant paths for a higher layer (e.g., L3) by using SRLG values set in a lower layer (e.g., L0/L1). Thus, it may be difficult to establish appropriate redundant paths using SRLGs especially in a large scale network. When determining redundant paths, a network administrator needs to have both knowledge of a lower layer (e.g., knowledge pertaining to the configuration of communication devices) and knowledge of a higher layer (e.g., knowledge pertaining to the quality of services to be provided, such as a bandwidth-guarantee type or a best-effort type). However, the actual situation is that network administrators having such knowledge are in short supply. Alternatively, an engineer having knowledge of a lower layer and an engineer having knowledge of a higher layer need to perform communications, and a long time could be needed to determine redundant paths.

SUMMARY

According to an aspect of the embodiments, a network control device includes: a storage configured to store an identifying value and a severity value for each of network elements of a network, the identifying values being hierarchized based on inclusion relationships between the network elements, the severity values each indicating a severity in sharing a risk of a failure occurrence in each of the network elements; and a processor configured to detect, when a first path and a second path that connect a source node and a destination node are designated, for each of a plurality of target identifying values corresponding to a plurality of network elements implementing the first path, a longest matched identifying value having a longest region matching the target identifying value from among a plurality of identifying values corresponding to a plurality of network elements implementing the second path, calculate a sum of severity values corresponding to the detected longest matched identifying values, and evaluate the second path with respect to the first path based on the calculated sum.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a multilayer network;

FIG. 2 illustrates examples of a primary path and a protection path established in a lower layer;

FIG. 4 illustrates an example of the configuration of a hierarchized SRLG;

FIG. 5 illustrates an example of an SRLG database;

FIG. 7 illustrates examples of SRLG information corresponding to designated paths;

FIG. 8 illustrates other examples of SRLG information corresponding to designated paths;

FIGS. 11A-11C illustrate an example of a method for designating a hierarchized SRLG;

FIG. 12 illustrates an example of a method for designating an upper limit and an optimized index for an SRLG violation cost.

DESCRIPTION OF EMBODIMENTS

Figure 3:
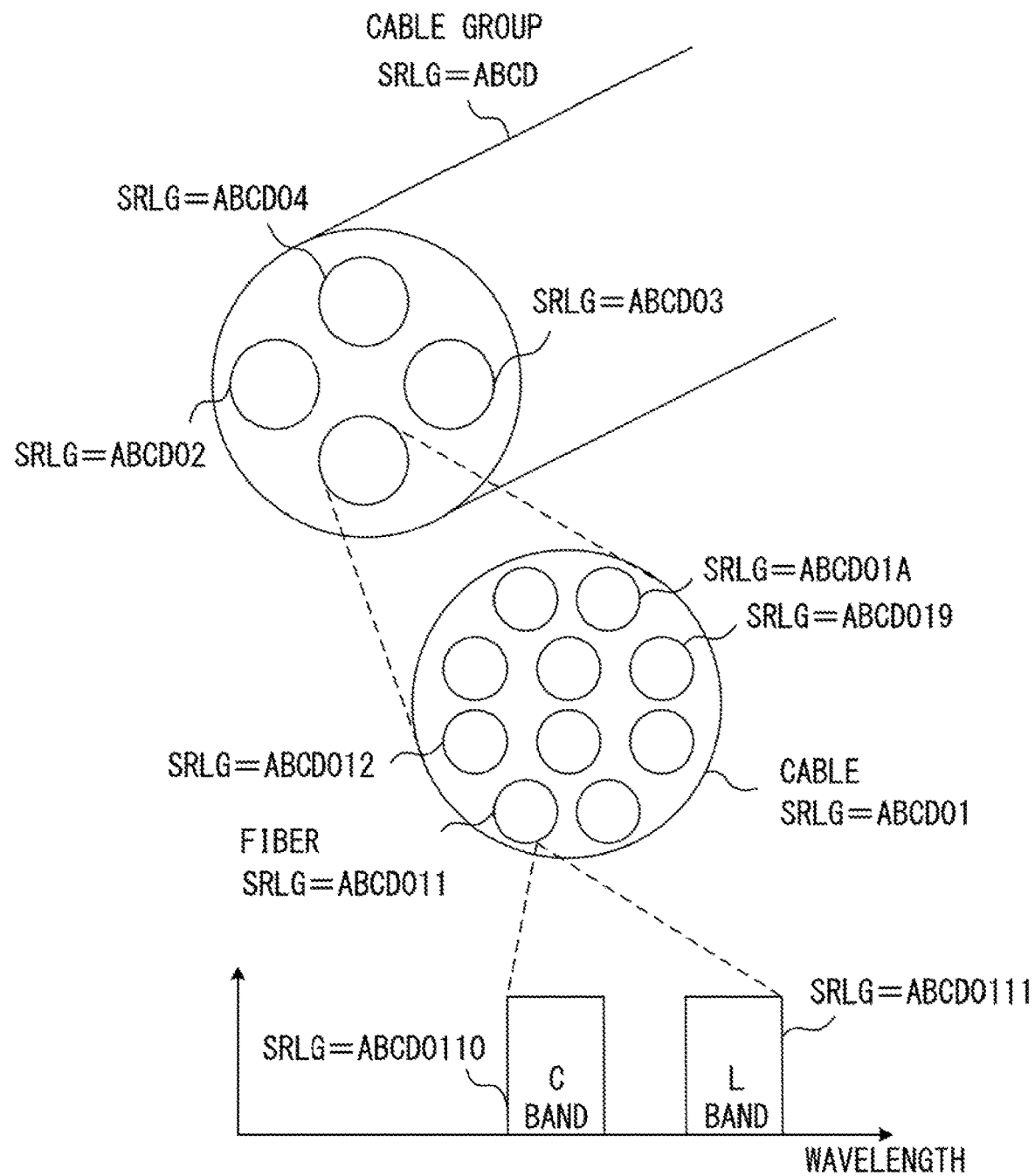
FIG. 3 illustrates an example of a hierarchy of SRLG values assigned to transmission lines.

FIG. 1 illustrates an example of a multilayer network. The multilayer network includes a higher layer and a lower layer.

The higher layer corresponds to a routing (L3) layer. The lower layer corresponds to a transport (L0/L1) layer.

The higher layer represents a logical network topology. The higher layer is provided with a plurality of communication nodes. FIG. 1 depicts a source node SN and a destination node DN in the higher layer. A primary path and a protection path are established between the source node SN and the destination node DN. For example, a router may be implemented in each of the source node SN and the destination node DN.

The lower layer represents a physical network topology. The lower layer is provided with a plurality of communication nodes and transmission lines connecting the nodes. In the example depicted in FIG. 1, a plurality of optical add-drop devices (ROADMs) R1-R6 are implemented between the source node SN and the destination node DN. The nodes are connected by optical fiber transmission lines.

A network control device 1 provides a function for operating the higher layer and the lower layer in cooperation with each other. For example, when the primary path and the protection path are designated in the higher layer, the network control device 1 may decide whether these paths are appropriate in the lower layer. Specifically, the network control device 1 uses shared risk link group (SRLG) to calculate a risk of concurrent occurrence of a failure in the designated primary path and protection path.

FIG. 2 illustrates examples of a primary path and a protection path established in a lower layer. In this example, a plurality of ROADMs (R1-R6) are implemented between a source node SN and a destination node DN. Optical fiber transmission lines L1-L13 are installed between the nodes.

SRLG values are assigned in advance to network elements on the multilayer network. That is, SRLG values are assigned to communication devices implemented in the nodes and the transmission lines connecting the nodes. In particular, different SRLG values are assigned to the ROADM_R1 to ROADM_R6, the source node SN, and the destination node DN. Different SRLG values are assigned to the optical fiber transmission lines L1-L13. In this example, an SRLG value consists of 32 bits or less.

The primary path and the protection path are designated in the higher layer. In this example, the primary path carries a signal from the source node SN via the ROADM_R3 and the ROADM_R4 to the destination node DN. The protection path carries a signal from the source node SN via the ROADM_R3, the ROADM_5, and the ROADM_R6 to the destination node DN.

The network control device 1 decides whether the protection path is appropriate for the primary path by using SRLG values. In the example depicted in FIG. 2, network elements forming the primary path are the transmission line L4, the ROADM_R3, the transmission line L6, the ROADM_R4, and the transmission line L8. Thus, the network control device 1 obtains SRLG values corresponding to the transmission line L4, the ROADM_R3, the transmission line L6, the ROADM_R4, and the transmission line L8. Network elements forming the protection path are the transmission line L4, the ROADM_R3, the transmission line L10, the ROADM_R5, the transmission line L11, the ROADM_R6, and the transmission line L13. Thus, the network control device 1 obtains SRLG values corresponding to the transmission line L4, the ROADM_R3, the transmission line L10, the ROADM_R5, the transmission line L11, the ROADM_R6, and the transmission line L13. Then, the network control device 1 decides whether the protection path is appropriate for the primary path by comparing the SRLG values corresponding to the primary path with the SRLG values corresponding to the protection path. In particular, a risk of concurrent occurrence of a failure in the primary path and the protection path is calculated in accordance with a matched length between each of the SRLG values corresponding to the primary path and each of the SRLG values corresponding to the protection path.

In the example depicted in FIG. 2, the transmission line L4 is shared by the primary path and the protection path. The ROADM_R3 is also shared by the primary path and the protection path. Thus, in this redundancy configuration, a failure could occur concurrently in the primary path and the protection path.

However, a cable connecting nodes may accommodate a plurality of optical fibers. Thus, a risk of concurrent occurrence of a failure in the primary path and the protection path may vary depending on how network elements (i.e., optical fibers) are allocated to the primary and protection paths. For example, the transmission line L4 may accommodate a plurality of optical fibers. In this case, when the same optical fiber in the transmission line L4 is allocated to the primary path and the protection path, a risk of concurrent occurrence of a failure in the primary path and the protection path will increase. When different optical fibers in the transmission line L4 are allocated to the primary path and the protection path, a risk of concurrent occurrence of a failure in the primary path and the protection path will decrease.

A communication device may include a plurality of communication processing units separated from each other to implement a wide variety of communications. Thus, a risk of concurrent occurrence of a failure in the primary path and the protection path may vary depending on how network elements (i.e., communication processing units) are allocated to the primary and protection paths. For example, the ROADM_R3 may accommodate a plurality of optical switches. In this case, when the same optical switch in the ROADM_R3 is allocated to the primary path and the protection path, a risk of concurrent occurrence of a failure in the primary path and the protection path will increase. When different optical switches in the ROADM_R3 are allocated to the primary path and the protection path, a risk of concurrent occurrence of a failure in the primary path and the protection path will decrease.

Accordingly, in embodiments of the present invention, SRLG values assigned to network elements are hierarchized. In this example, SRLG values assigned to transmission lines and SRLG values assigned to communication devices are hierarchized.

FIG. 3 illustrates an example of hierarchy of SRLG values assigned to transmission lines. In this example, a cable group is installed between nodes. The cable group includes four individual cables. Each of the individual cables accommodates ten optical fibers. In addition, a C band optical signal and an L band optical signal are transmitted through the optical fibers.

In this case, one SRLG value is assigned to the cable group. In this example, a 16-bit SRLG value "0xABCD" is assigned to the cable group.

The four individual cables forming the cable group are installed on the same route in parallel. Accordingly, an SRLG value is generated for each of the individual cables by adding a value identifying the individual cable to the SRLG value of the cable group. In particular, an SRLG value is obtained for each of the four individual cables by adding each of pieces of 8-bit identification information "0x0" to "0x04" to "0xABCD". Hence, 24-bit SRLG values "0xABCD01" to "0xABCD4" are assigned to each individual cable.

Ten optical fibers are accommodated in each individual cable. Accordingly, an SRLG value is generated for each of the optical fibers by adding a value identifying the optical fiber to the SRLG value of the individual cable. In particular, an SRLG value is obtained for each of the ten optical fibers accommodated in the individual cable identified as SRLG value "0xABCD01" by adding each of pieces of 4-bit identification information "0x1" to "0xA" to "0xABCD01". Hence, 28-bit SRLG values "0xABCD011" to "0xABCD0A" are assigned to each optical fiber.

A C band channel and an L band channel are prepared in each optical fiber. For example, an SRLG value may be obtained for each of the channels used in the optical fiber identified as SRLG value "0xABCD011" by adding each of pieces of 4-bit identification information "0x0" to "0x1" to "0xABCD011". Hence, 32-bit SRLG values "0xABCD0110" to "0xABCD011" are assigned to each channel.

Similarly, the SRLG values of communication devices are hierarchized. For example, a 16-bit SRLG value "0xFEDC" may be assigned to a ROADM. In this case, an SRLG value is generated for each of the wavelength selective switches (WSSs) implemented in the ROADM by adding four-bit identification information to the SRLG value of the ROADM. For example, a 20-bit SRLG value "0xFEDCB" may be assigned to one WSS. An SRLG value is generated for each of the transponder blades connected to a WSS by adding four-bit identification information to the SRLG value of the WSS. For example, a 24-bit SRLG value "0xFEDCBA" may be assigned to one transponder blade. An SRLG value is generated for a plug-in unit (PIU) implemented in a transponder blade by adding four-bit identification information to the SRLG value of the transponder blade. For example, a 28-bit SRLG value "0xFEDCBA9" may be assigned to one PIU. An SRLG value is generated for a digital signal processor (DSP) implemented in a PIU by adding four-bit identification information to the SRLG value of the PIU. For example, a 32-bit SRLG value "0xFEDCBA98" may be assigned to one DSP.

FIG. 4 illustrates an example of the configuration of a hierarchized SRLG. In this example, an SRLG value consists of 32 bits or less. A "type" indicates network elements having the same hierarchical structure and an equal severity in a shared risk. For example, different types may be assigned to optical fiber cables provided by different vendors. Meanwhile, different types may be assigned to aerial cables and cables buried under the ground even if these optical fiber cables are provided by the same vendor. In addition, different types may be assigned to communication devices provided by different vendors. Different types may be assigned to communication devices provided by the same vendor if the product versions are different.

A hierarchical structure is defined for each type. In the example depicted in FIG. 4, the SRLG includes three classes. Class #1 is represented by information identifying a type and information identifying the network elements belonging to class #1. Class #2 is represented by information identifying a type, information identifying the network elements belonging to class #1, and information identifying the network elements belonging to class #2. Class #3 is represented by information identifying a type, information identifying the network elements belonging to class #1, information identifying the network elements belonging to class #2, and information identifying the network elements belonging to class #3. In the example depicted in FIG. 3, "A" indicates a type (i.e., the type of an optical fiber cable), "ABCD" (i.e., cable group) corresponds to class #1, and "ABCD01" (i.e., individual cable) corresponds to class #2.

An SRLG configuration is defined for each type. In particular, a length for each class is optionally determined in accordance with the configuration, characteristics, or the like of network elements.

FIG. 5 illustrates an example of an SRLG database for managing the SRLG values of network elements. The SRLG database may be implemented in a site that the network control device 1 can access. Alternatively, the SRLG database may be implemented in the network control device 1.

The SRLG database manages an SRLG value and a severity for each network element. As described above, an SRLG value is an example of identification information hierarchized in accordance with the inclusion relationship between network elements. A severity indicates a severity in sharing a risk of a failure occurrence in network elements (a risk of failure occurrence for each hierarchized class or a severity in a shared risk).

For example, a primary path and a protection path may be established on the same individual cable. In the case depicted in FIG. 2, the primary path and the protection path are established on the transmission line L4. In this case, when the primary path and the protection path are established on different optical fibers in the same individual cable, even when a failure occurs in the optical fiber on which the primary path is established, a communication can be continued as long as the optical fiber on which the protection path is established is operated normally. By contrast, in a case where the primary path and the protection path are established on the same optical fiber, a communication cannot be continued when a failure occurs in the optical fiber. Thus, a severity at a failure occurrence will be higher in a case where the primary path and the protection path are established on the same optical fiber in the same individual cable than in a case where the primary path and the protection path are established on the same individual cable.

For example, a severity may be determined for each network element by a network administrator in simulation or according to past instances. The network control device 1 uses the severities to calculate a risk of concurrent occurrence of a failure in the primary path and the protection path.

Figure 6:
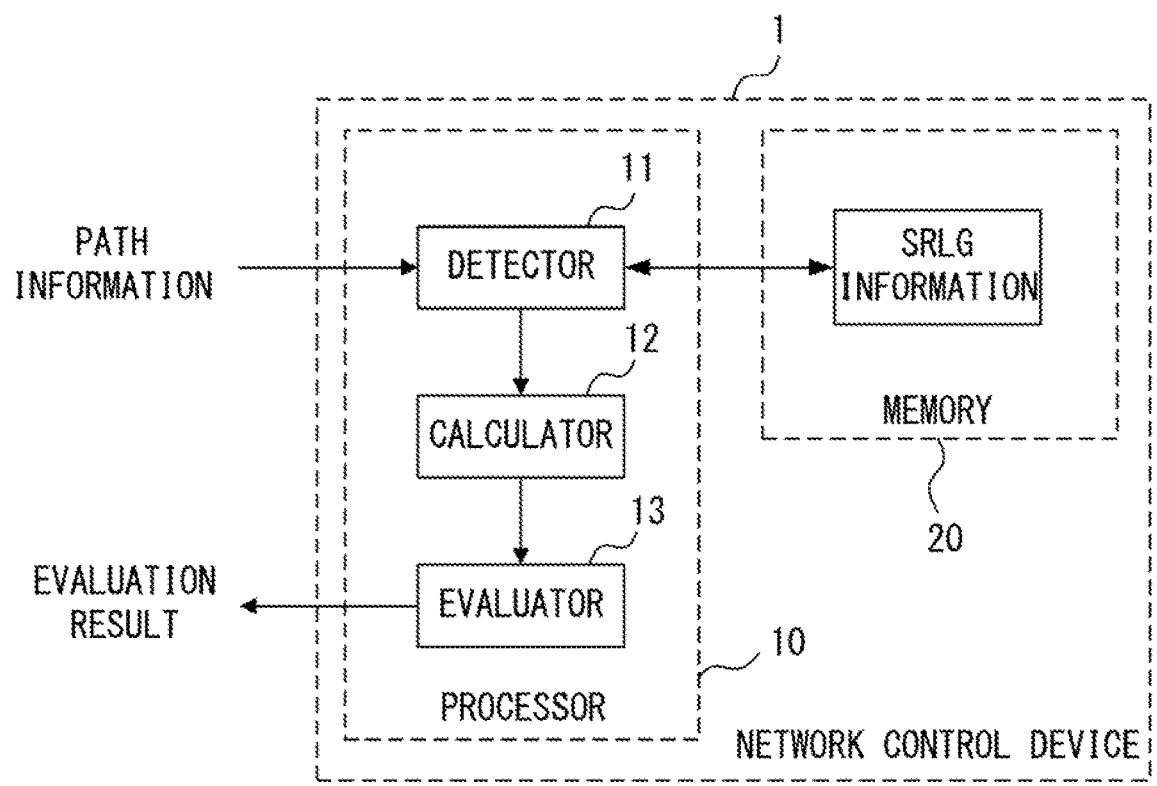
FIG. 6 illustrates an example of a network control device.

FIG. 6 illustrates an example of the network control device 1. As depicted in FIG. 6, the network control device 1 includes a processor 10 and a memory 20. However, the network control device 1 may include other circuits or functions that are not depicted in FIG. 6. For example, the network control device 1 may include an input/output interface, a communication interface, or a storage device.

The processor 10 provides a function for controlling a network by executing a program stored in the memory 20. In this example, the processor 10 can evaluate whether a primary path and a protection path designated in a higher layer are appropriate by executing the program stored in the memory 20. In particular, the processor 10 provides functions of a detector 11, a calculator 12, and an evaluator 13.

The memory 20 can store a program to be executed by the processor 10. The memory 20 can also store SRLG information. SRLG information includes, for each of the network elements forming the network, identification information hierarchized in accordance with the inclusion relationships between the network elements and a severity value indicating a severity in sharing a risk of failure occurrence in the network elements (a risk of failure occurrence for each hierarchized class or a severity in a shared risk).

The memory 20 may store SRLG information for all of the network elements forming the network. When SRLG information is stored in a storage device that does not belong to the network control device 1, the network control device 1 may acquire SRLG information corresponding to a designated path (or links consisting of a designated path) from this storage device and store the acquired information in the memory 20.

Path information is supplied to the detector 11. For example, path information may be generated by a path computing element that determines an L3 path to be established. Path information also designates a primary path (or a first path) and a protection path (or a second path) for connecting a source node and a destination node in L3. The detector 11 detects, for each of a plurality of SRLG values corresponding to a plurality of network elements implementing a primary path, a longest-matched SRLG value having the greatest matched bit length among a plurality of SRLG values corresponding to a plurality of network elements implementing a protection path.

The calculator 12 calculates the sum of a plurality of severity values associated with a plurality of longest-matched SRLG values detected by the detector 11. The evaluator 13 evaluates the protection path with respect to the primary path according to the sum calculated by the calculator 12. For example, the network administrator may present an upper limit indicating an SRLG violation cost on the network to the evaluator 13. In this case, the evaluator 13 decides whether the protection path is appropriate for the primary path by comparing the sum calculated by the calculator 12 with the upper limit. When a plurality of protection path candidates are designated for a primary path, the network administrator may present an evaluation policy to the evaluator 13. As an example, "Evaluation policy: Smallest sum of severity values" may be presented. In this case, the evaluator 13 selects a protection path candidate with the smallest sum of severity values from the plurality of protection path candidates.

Next, descriptions are given of a method for calculating a risk of concurrent occurrence of a failure in a primary path and a protection path. In this example, the primary path and the protection path depicted in FIG. 2 are designated in a higher layer. Thus, the network control device 1 is supplied with path information designating the primary path and the protection path depicted in FIG. 2.

The network control device 1 acquires SRLG information for network elements implementing the primary path and network elements implementing the protection path. In this example, the detector 11 acquires the SRLG information depicted in FIG. 7.

First to fourth bits of the SRLG information of each transmission line indicate a type. In this example, all of the transmission lines belong to the same type. Thus, the definitions of fifth to thirty-second bits of pieces of SRLG information are the same for all of the transmission lines. In particular, the fifth to sixteenth bits identify a cable group. The seventeenth to twenty-fourth bits identify an individual cable. The twenty-fifth to thirty-first bits identify an optical fiber. The thirty-second bit identifies a wavelength band. The definition of severity is also the same for all of the transmission lines.

The first to fourth bits of the SRLG information of each ROADM indicate a type. In this example, all of the ROADMs belong to the same type. Thus, the definitions of fifth to thirty-second bits of pieces of SRLG information are the same for all of the ROADMs. In particular, the fifth to sixteenth bits identify a ROADM node. The seventeenth to twentieth bits identify a WSS implemented in the ROADM. The twenty-first to twenty-fourth bits identify a transponder blade connected to the WSS. The twenty-fifth to twenty-eighth bits identify a PIU implemented in the transponder blade. The twenty-ninth to thirty-second bits identify a DSP implemented in the PIU. The definition of severity is also the same for all of the ROADMs.

In FIG. 7, severity information is represented as "i(j)". "i(j)" means that a severity value is "i" when the high j bits of a pair of SRLG values match each other. When, for example, the SRLGs pertaining to transmission lines are referred to, the severity is "10" when the high 16 bits of a pair of SRLG values match each other, the severity is "20" when the high 24 bits of a pair of SRLG values match each other, the severity is "40" when the high 31 bits of a pair of SRLG values match each other, and the severity is "50" when the high 32 bits of a pair of SRLG values match each other.

As described above, for each of the SRLG values corresponding to the network elements implementing the primary path (L4, R3, L6, R4, L8), the detector 11 detects a longest-matched SRLG value having the greatest matched bit length among the SRLG values corresponding to the network elements implementing the protection path (L4, R3, L10, R5, L11, R6, L13).

The detector 11 compares the SRLG value of the L4 of the primary path with each of the seven SRLG values corresponding to the protection path and counts the bit lengths of regions having values matching each other. In this case, the lengths of regions with continuously matched high bits are as follows.

(1) L4 of the primary path and L4 of the protection path: 24 bits (2) L4 of the primary path and R3 of the protection path: 1 bit (3) L4 of the primary path and L10 of the protection path: 8 bits (4) L4 of the primary path and R5 of the protection path: 1 bit (5) L4 of the primary path and L11 of the protection path: 10 bits (6) L4 of the primary path and R6 of the protection path: 1 bit (7) L4 of the primary path and L13 of the protection path: 8 bits Accordingly, the SRLG value of the L4 of the protection path has the greatest-bit-length region matching the SRLG value of the L4 of the primary path, and the bit length of the matched region is 24 bits.

The detector 11 compares the SRLG value of the R3 of the primary path with each of the seven SRLG values corresponding to the protection path and counts the bit lengths of regions having values matching each other. In this case, the lengths of regions with continuously matched high bits are as follows.

(1) R3 of the primary path and L4 of the protection path: 1 bit (2) R3 of the primary path and R3 of the protection path: 16 bits (3) R3 of the primary path and L10 of the protection path: 1 bit (4) R3 of the primary path and R5 of the protection path: 12 bits (5) R3 of the primary path and L11 of the protection path: 1 bit (6) R3 of the primary path and R6 of the protection path: 9 bits (7) R3 of the primary path and L13 of the protection path: 1 bit Accordingly, the SRLG value of the R3 of the protection path has the greatest-bit-length region matching the SRLG value of the R3 of the primary path, and the bit length of the matched region is 16 bits.

The detector 11 compares the SRLG value of the L6 of the primary path with each of the seven SRLG values corresponding to the protection path and counts the bit lengths of regions having values matching each other. In this case, the lengths of regions with continuously matched high bits are as follows.

(1) L6 of the primary path and L4 of the protection path: 8 bits (2) L6 of the primary path and R3 of the protection path: 1 bit (3) L6 of the primary path and L10 of the protection path: 9 bits (4) L6 of the primary path and R5 of the protection path: 1 bit (5) L6 of the primary path and L11 of the protection path: 8 bits (6) L6 of the primary path and R6 of the protection path: 1 bit (7) L6 of the primary path and L13 of the protection path: 9 bits Accordingly, the SRLG value of the L10 of the protection path and the SRLG value of the L13 of the protection path have the greatest-bit-length regions matching the SRLG value of the L6 of the primary path, and the bit lengths of the matched regions are 9 bits.

The detector 11 compares the SRLG value of the R4 of the primary path with each of the seven SRLG values corresponding to the protection path and counts the bit lengths of regions having values matching each other. In this case, the lengths of regions with continuously matched high bits are as follows.

(1) R4 of the primary path and L4 of the protection path: 1 bit (2) R4 of the primary path and R3 of the protection path: 8 bits (3) R4 of the primary path and L10 of the protection path: 1 bit (4) R4 of the primary path and R5 of the protection path: 8 bits (5) R4 of the primary path and L11 of the protection path: 1 bit (6) R4 of the primary path and R6 of the protection path: 8 bits (7) R4 of the primary path and L13 of the protection path: 1 bit Accordingly, the SRLG value of the R3 of the protection path, the SRLG value of the R5 of the protection path, and the SRLG value of the R6 of the protection path have the greatest-bit-length regions matching the SRLG value of the R4 of the primary path, and the bit lengths of the matched regions are 8 bits.

The detector 11 compares the SRLG value of the L8 of the primary path with each of the seven SRLG values corresponding to the protection path and counts the bit lengths of regions having values matching each other. In this case, the lengths of regions with continuously matched high bits are as follows.

(1) L8 of the primary path and L4 of the protection path: 8 bits (2) L8 of the primary path and R3 of the protection path: 1 bit (3) L8 of the primary path and L10 of the protection path: 9 bits (4) L8 of the primary path and R5 of the protection path: 1 bit (5) L8 of the primary path and L11 of the protection path: 8 bits (6) L8 of the primary path and R6 of the protection path: 1 bit (7) L8 of the primary path and L13 of the protection path: 9 bits Accordingly, the SRLG value of the L10 of the protection path and the SRLG value of the L13 of the protection path have the greatest-bit-length regions matching the SRLG value of the L8 of the primary path, and the bit lengths of the matched regions are 9 bits.

Subsequently, the calculator 12 calculates the sum of severity values associated with the longest-matched SRLG values detected by the detector 11. The greatest matched bit length corresponding to the SRLG value of the transmission line IA of the primary path is 24 bits. Thus, "20" is obtained as a severity value, as depicted in FIG. 7. Meanwhile, the greatest matched bit length corresponding to the SRLG value of the ROADM_R3 of the primary path is 16 bits. Thus, "10" is obtained as a severity value, as depicted in FIG. 7. In the other cases, the severity values are zero since the greatest matched bit lengths are less than 16. As a result, "30" is obtained as the sum of the severity values.

The evaluator 13 evaluates the protection path with respect to the primary path according to the sum calculated by the calculator 12. For example, the network administrator may present "25" to the network control device 1 as an upper limit indicating a network cost. In this case, the sum of severity values is greater than the upper limit. Thus, the evaluator 13 determines that the protection path designated for the primary path is inappropriate.

As described above, upon receipt of path information designating a primary path and a protection path, the network control device 1 obtains the SRLG values of the network elements forming the primary path and the SRLG values of the network elements forming the protection path. The SRLG values are pieces of identification information identifying the network elements that have been hierarchized in accordance with the inclusion relationships between the network elements. The network control device 1 calculates, according to the greatest matched bit lengths between the SRLG values, severities for a risk of concurrent occurrence of a failure in both the primary path and the protection path and evaluates whether the primary path and the protection path are appropriate according to the sum of the severities. Accordingly, an evaluation can be automatically made in a short time as to whether a protection path is appropriate for a primary path.

In the example depicted in FIG. 7, severities are set for all of the network elements. However, the present invention is not limited to this method. For example, in the SRLG hierarchy in accordance with embodiments of the present invention, a severity configuration may be defined for each network element type. Hence, the network control device 1 may manage information pertaining to a severity for each network element type, as depicted in FIG. 8. In this case, the memory region for storing SRLG information can be made small.

In the examples described above, paths are evaluated using the SRLG values of network elements between a source node and a destination node (optical fiber transmission lines and communication devices such as ROADMs in the examples). However, the present invention is not limited to this method. For example, when routers are a source node and a destination node, paths will preferably be evaluated in consideration of the SRLG values of line cards for the routers.

Figure 9:
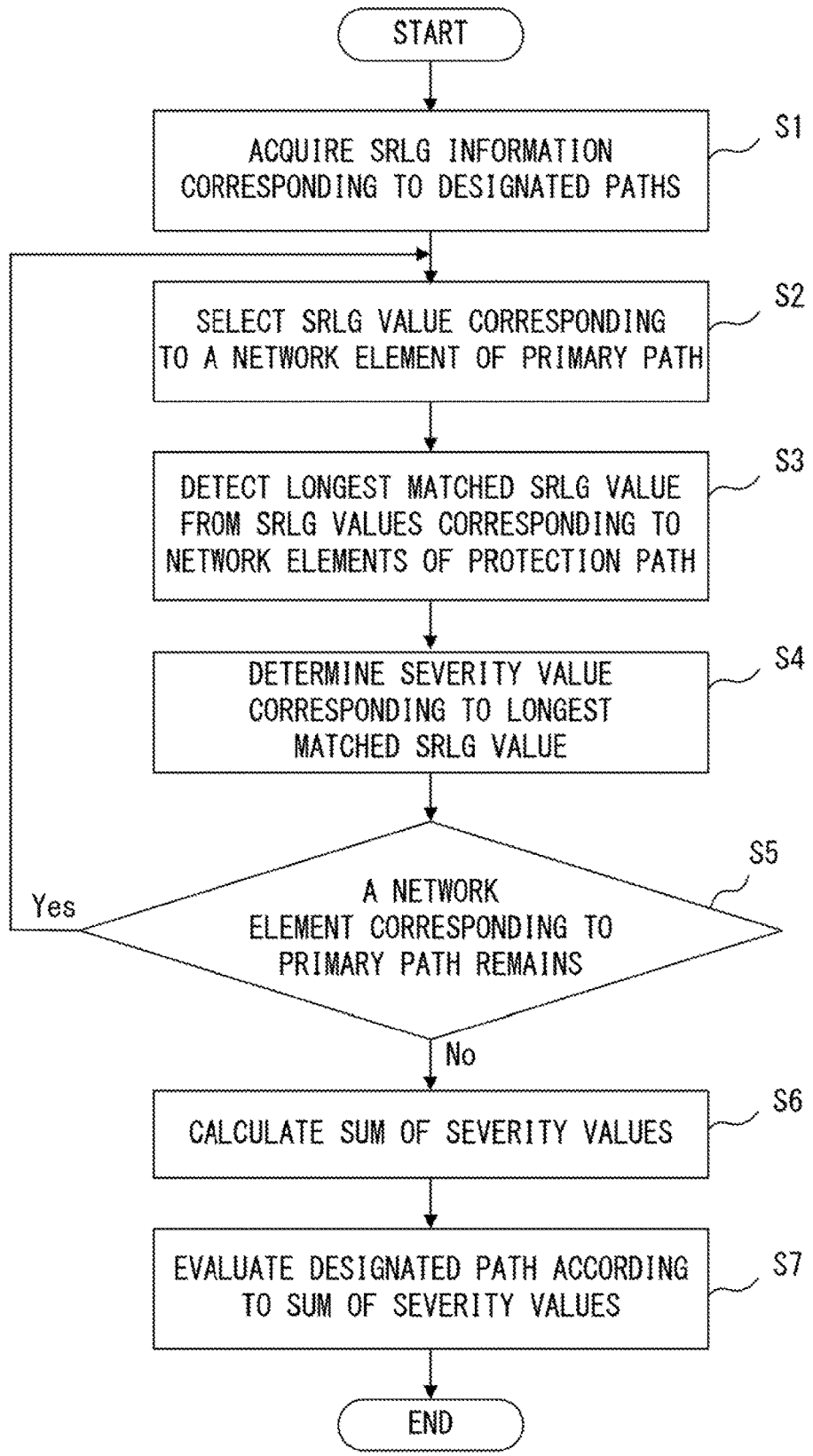
FIG. 9 is a flowchart illustrating an example of a method for evaluating a designated path.

FIG. 9 is a flowchart illustrating an example of a method for evaluating a designated path. The processes of this flowchart are performed by the network control device 1 when a primary path and a protection path are designated.

In S1, the detector 11 acquires SRLG information of network elements forming a designated primary path and SRLG information of network elements forming a designated protection path. The SRLG information includes, for example, SRLG values (i.e., identification information) and severity values. In S2, the detector 11 selects an SRLG value to be of interest from a plurality of SRLG values corresponding to the plurality of network elements forming the primary path. The SRLG value selected in S2 may hereinafter be referred to as a "target SRLG value".

In S3, the detector 11 detects a longest matched SRLG value having the greatest-bit-length region matching the target SRLG value from a plurality of SRLG values corresponding to the plurality of network elements forming the protection path. In S4, the calculator 12 determines a severity value based on the bit length of the region for which the target SRLG value and the longest matched SRLG value match each other.

In S5, the detector 11 decides whether the processes of S3-S4 have been finished for all of the SRLG values corresponding to the primary path. In this case, the process of the network control device 1 returns to S2 when an SRLG value for which the processes of S3-S4 have not been finished remains. When the processes of S3-S4 have been finished for all of the SRLG values corresponding to the primary path, the process of the network control device 1 shifts to S6.

In S6, the calculator 12 calculates the sum of a plurality of severity values obtained by repeatedly performing the processes of S2-S5. The sum of severity values corresponds to an SRLG violation cost on the paths between the source node and the destination node. In S7, the evaluator 13 decides whether the protection path has been appropriately set for the primary path according to the sum of severity values. In this case, for example, the evaluator 13 may evaluate the designated path by comparing the sum of severity values with a specified upper limit. Alternatively, when a plurality of protection path candidates are designated, the evaluator 13 may select a preferable one of the plurality of protection path candidates according to a specified evaluation policy.

EXAMPLES

Figure 10:
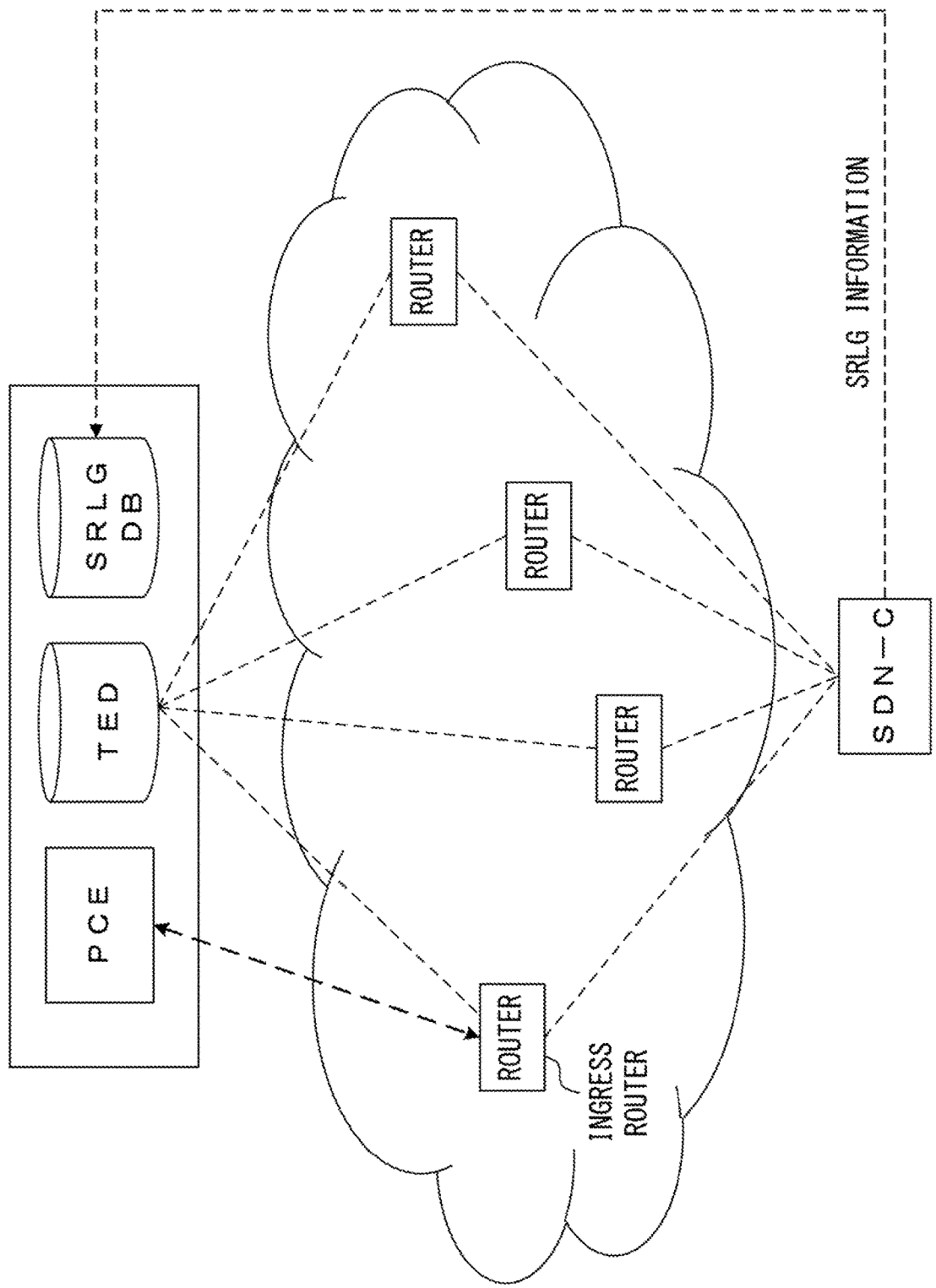
FIG. 10 illustrates an example of a network system in accordance with embodiments of the present invention.
Figure 13:
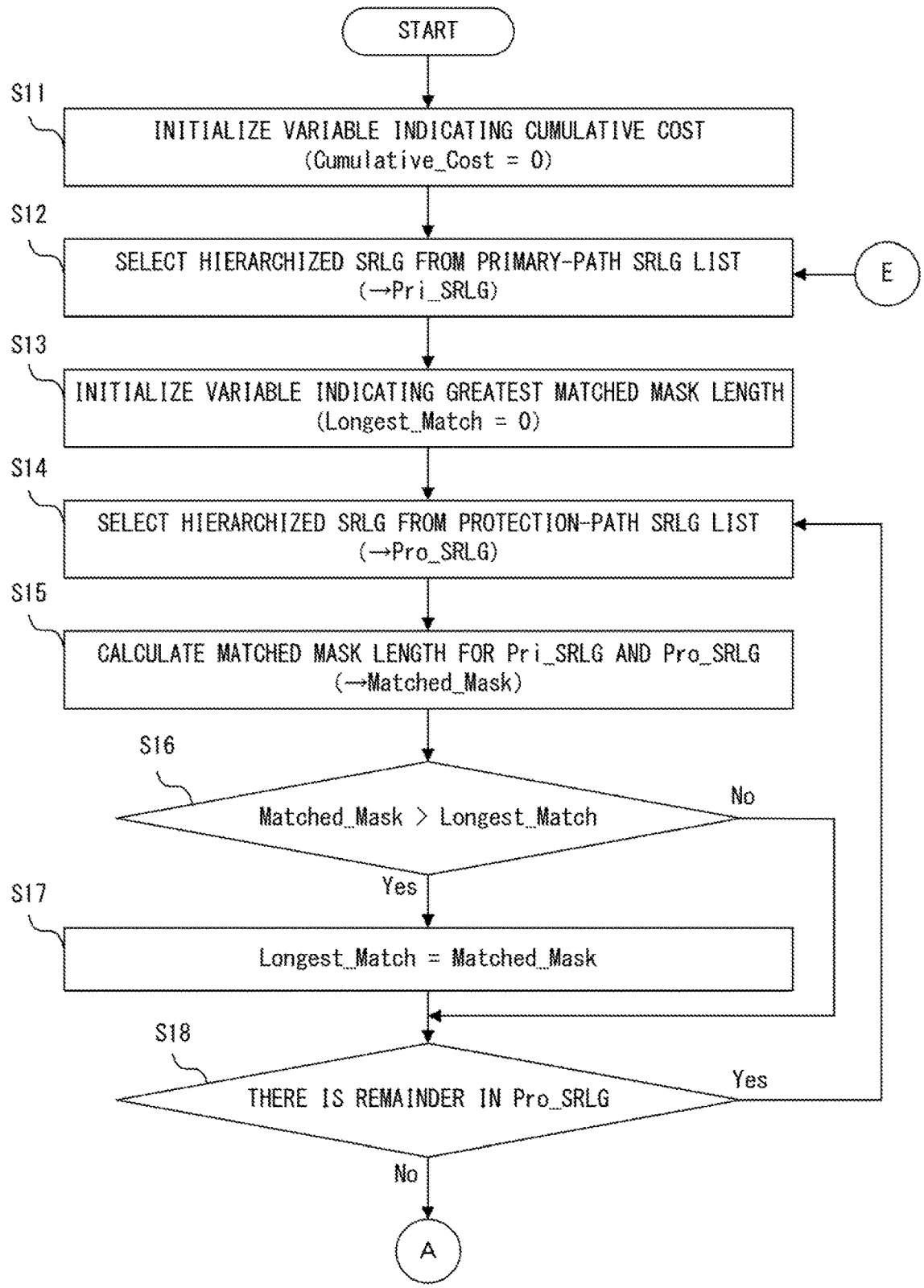
FIGS. 13-16 are flowcharts illustrating an example of a method for calculating a cumulative cost.
Figure 14:
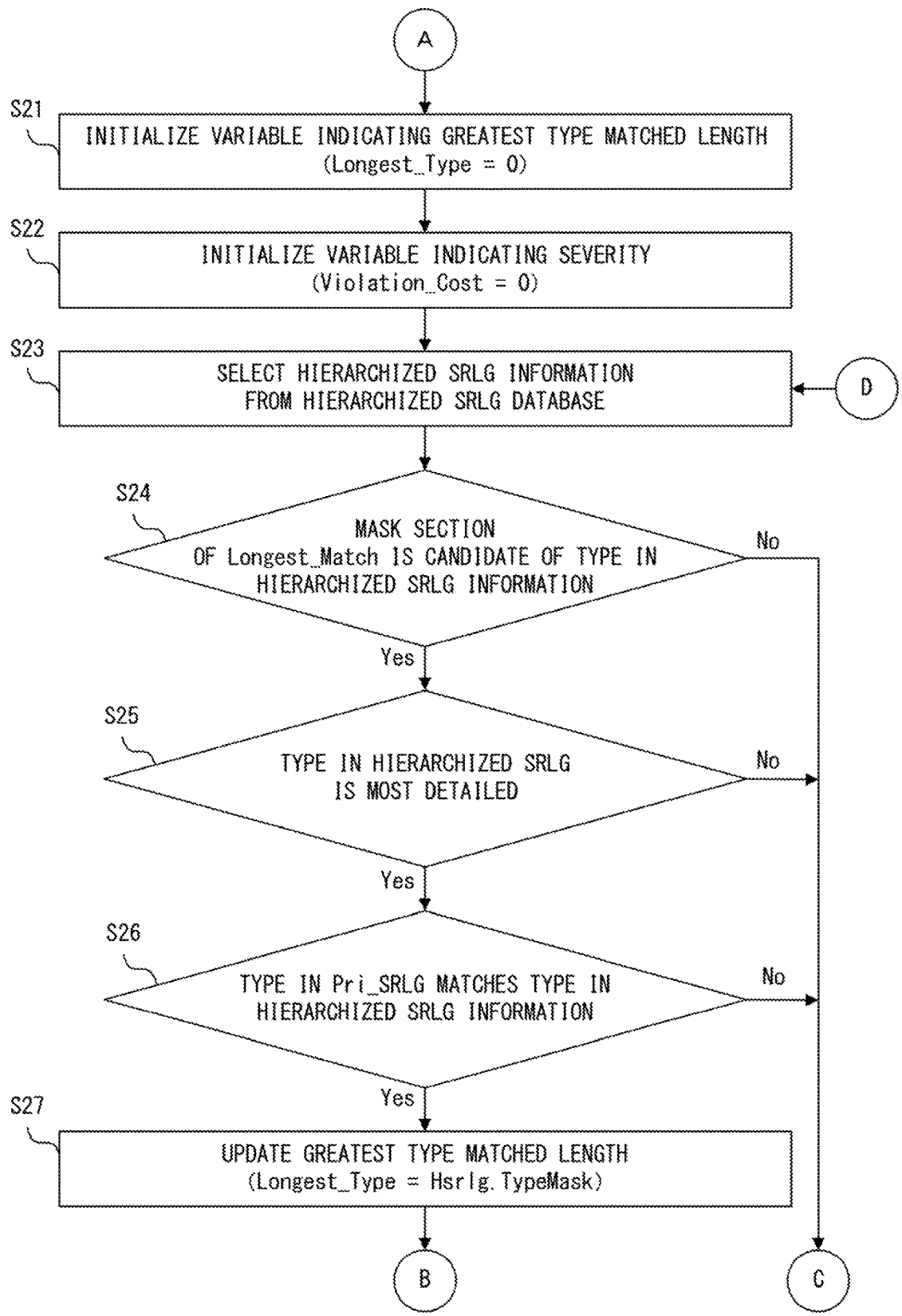
Figure 15:
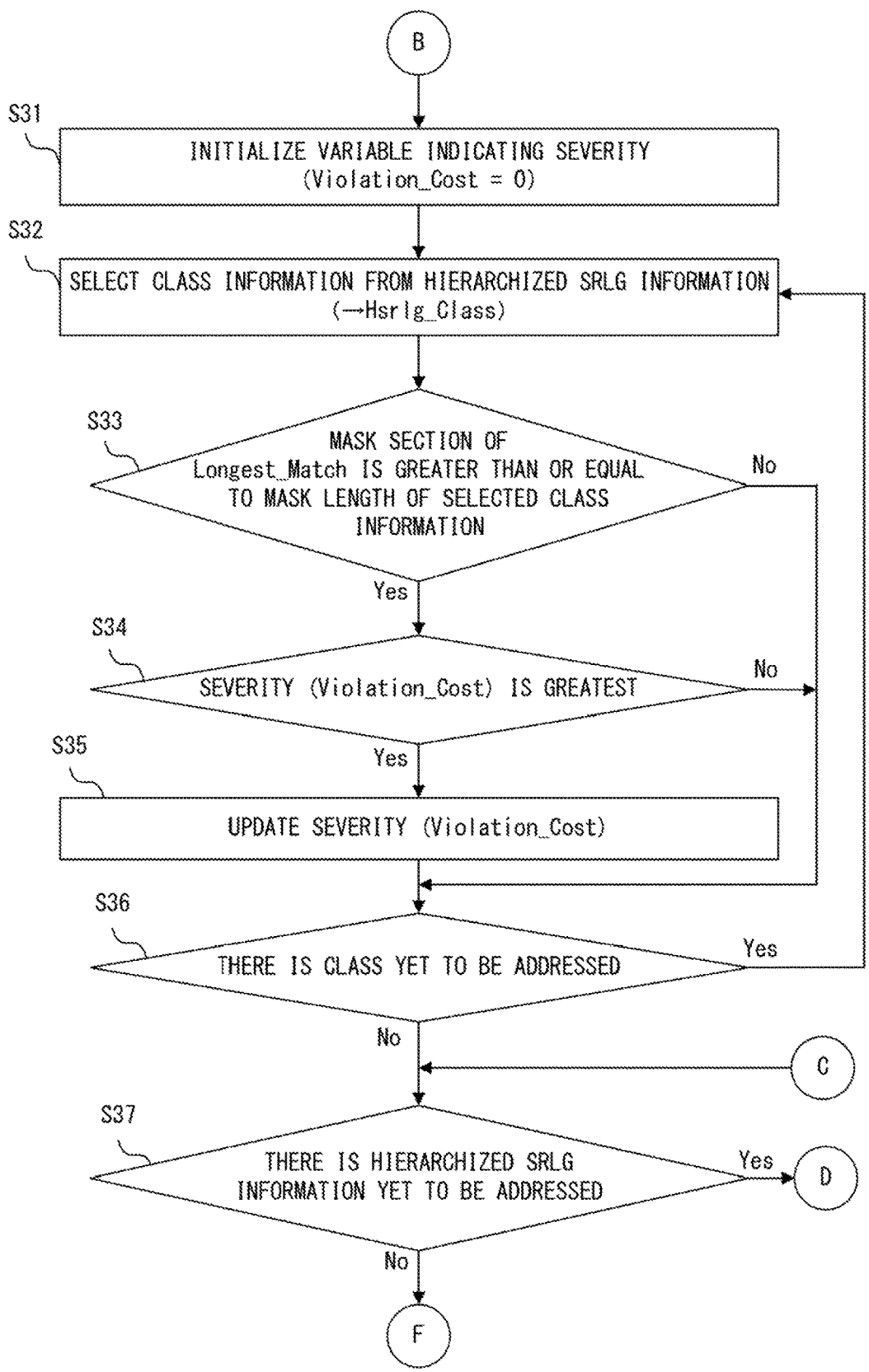
Figure 16:
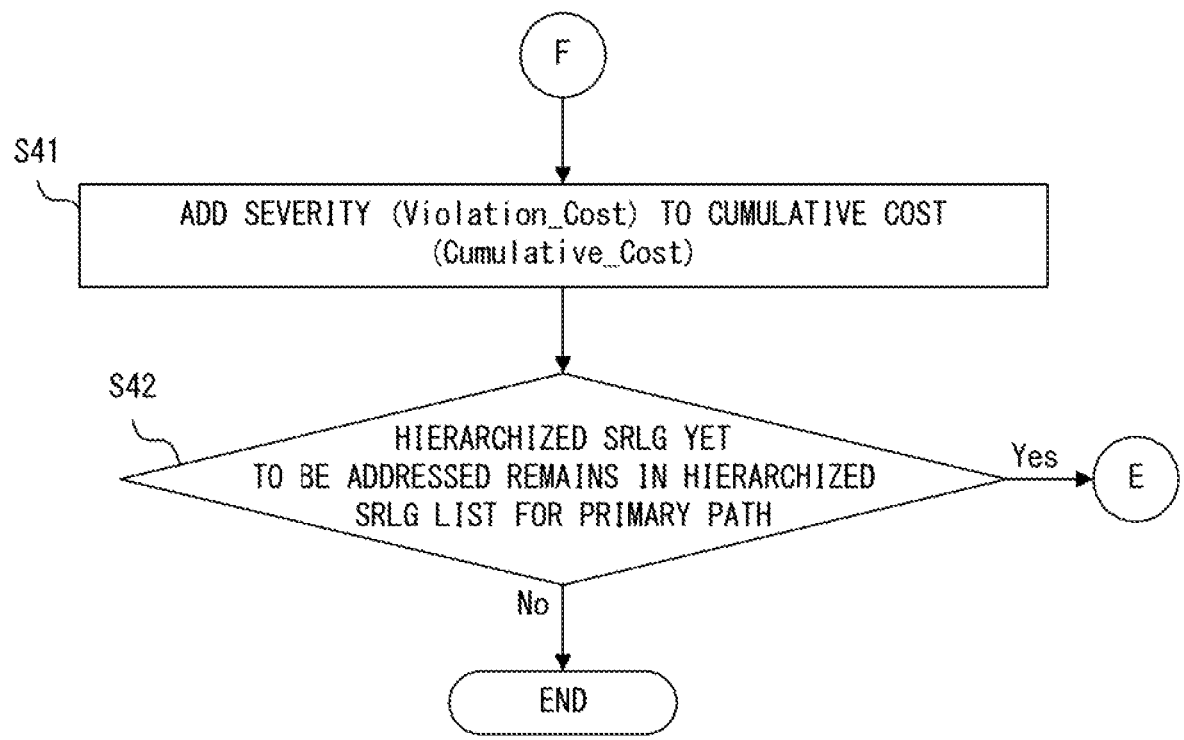

FIG. 10 illustrates an example of a network system in accordance with embodiments of the present invention. In this example, a network includes a plurality of L3 routers. The L3 routers are connected by optical fiber cables. One or more ROADMs are provided between L3 routers.

A software-defined-network (SDN) controller defines the configuration, operation, and performance of the network by means of software. In response to a request from an ingress router, a path computing element (PCE) designates a path between the ingress router and an egress router. The ingress router and the egress router respectively correspond to the source node and the destination node depicted in FIG. 2. The path computing element designates a primary path and a protection path in response to a request from the ingress router. In this case, the path computing element may designate a plurality of protection paths for one primary path.

A traffic engineering database (TED) stores information for establishing a path by means of RSVP-TE or the like. An SRLG database stores SRLG information.

In this network system, an SDN controller defines a hierarchized class for each network element type. A hierarchized class indicates the numbers of bits allocated to information for identifying network element types and to information for identifying classes. A severity is also set for each class. The SDN controller registers hierarchized classes in the SRLG database. In this case, the SDN controller accesses the SRLG database via, for example, an API such as SQL.

The SDN controller assigns SRLG values to network elements. The SDN controller registers the SRLG values in the SRLG database. In this case, the SDN controller accesses the SRLG database via, for example, an API such as SQL.

The SDN controller sets, for each L3 router, an SRLG number list for all of the network elements forming links between the routers. The SRLG number list includes SRLG numbers corresponding to the network elements in all layers monitored or controlled by the SDN controller.

A TED is built by advertising the SRLG number lists. For example, the advertisement may be implemented by means of an IGP protocol. Alternatively, the advertisement may be implemented by means of BGP-LS.

The path computing element designates a primary path and a protection path in response to a request received from the ingress router. The path computing element provides the function of the network control device 1 in embodiments of the present invention. Thus, the path computing element decides on a primary path and a protection path by using hierarchized SRLGs. The path computing element reports the decided primary path and protection path to the ingress router. In response to this, the ingress router establishes a TE path by means of, for example, RSVP-TE signaling or segment routing (SR).

The ingress router and the path computing element may use the PCE protocol. In this case, the ingress router sends the path computing element a path calculation request for the primary path and the protection path by using a PCReq message. Meanwhile, an upper limit (i.e., Bound) may be designated by Metric_object for a cumulative SRLG value for an end-to-end communication. Alternatively, an optimized index for a cumulative SRLG value for an end-to-end communication may be designated by objective function (OF) object.

FIGS. 11A-11C illustrate an example of a method for designating a hierarchized SRLG. In this example, a hierarchized SRLG includes an SRLG type, a type mask, the number of classes, and class details, as depicted in FIG. 11A. An SRLG type (SRLG Type) indicates a type of a network element. A type mask (Type Mask) designates the length of the SRLG type. The number of classes (# of Classes) designates the number of classes provided for an SRLG type. Class details include a class mask and a class severity. A class mask (Class Mask) designates a class mask length provided for an SRLG type. Note that a class mask is designated under the following condition, where n indicates the number of classes.

$$0 \leq \text{Type Mask} \leq \text{Class \#}i \text{ Mask} \leq \text{Class \#}j \text{ Mask} \leq 32$$
$$(1 \leq i < j < n)$$

The class severity (Class Severity) designates a class severity (violation cost) provided for the SRLG type. Note that a class severity is designated under the following condition.

$$0 \leq \text{Class } \#i \text{ Severity} \leq \text{Class } \#j \text{ Severity} \leq 255 (1 \leq i < j < n)$$

FIG. 11B illustrates a specific example of a hierarchized SRLG. This hierarchized SRLG corresponds to the cable depicted in FIG. 3 (L0/L1 transport transmission line).

In this example, the type mask is "4". In this case, the high 4 bits of the SRLG type indicate a network element type. Zero is set for the other bits of the SRLG type. The number of classes is "4". In this case, four classes (#1 to #4) are defined. Class #1 has a mask of 16 bits and a severity of 10. That is, a condition in which "the severity is 10 when the high 16 bits are matched with" is defined. Class #2 has a mask of 24 bits and a severity of 20. That is, a condition in which "the severity is 20 when the high 24 bits are matched with" is defined.

FIG. 11C illustrates another specific example of a hierarchized SRLG. In this example, five classes are defined.

FIG. 12 illustrates an example of a method for designating an upper limit and an optimized index for an SRLG violation cost. In this example, an upper limit and an optimized index for an SRLG violation cost are set in a PCReq message under the PCE protocol.

When setting an upper limit in the PCReq message, a Metric Object with an Object-Class of "6" and an Object-Type of "1" is used. Meanwhile, "1" is set for a Bound bit. The Object-Type and the Bound bit are respectively indicated as "OT" and "B" in FIG. 12. A Metric Type designates a metric type. Currently, 1-21 are defined as Metric Types, and 22-225 are unused. Accordingly, one of the unused Metric Types is assigned as an "upper limit" for the SRLG violation cost. A metric value is set in the metric-value. Thus, when "1" is set as the Bound bit and a value identifying the upper limit is set as the Metric Type, the value set in the metric-value indicates the "upper limit". In this case, the path computing element performs a path calculation such that the sum of SRLG values for an end-to-end communication does not exceed the upper limit set in the "metric-value".

When setting an optimized index in the PCReq message, an objective function (OF) object with an Object-Class of "21" and an Object-Type of "1" is used. A desired index can be designated using an objective function (OF) code. Currently, 1-14 are defined as OF codes, and 15-32767 are unused. Accordingly, one of the unused OF codes is assigned as an "optimized index" for the SRLG violation cost. In this example, a condition in which "the SRLG violation cost (or the sum of SRLG values for an end-to-end communication) is minimized" using the OF code may be defined.

FIGS. 13-16 are flowcharts illustrating an example of a method for calculating a cumulative cost. For example, the processes of these flowchart may be performed by the network control device 1 depicted in FIG. 6 after a primary path and a protection path are designated. Note that SRLG information indicating the SRLGs of network elements is created in advance. The cumulative cost corresponds to the sum of severities.

In S11, the detector 11 initializes and sets a variable Cumulative_Cost indicating the cumulative cost to zero. The cumulative cost indicates a risk of concurrent occurrence of a failure in both the primary path and the protection path between a source node and a destination node.

In S12, the detector 11 selects a hierarchized SRLG from an SRLG list for the primary path. In particular, the detector 11 selects one of the network elements forming the primary path and acquires hierarchized SRLG information corresponding to the selected network element. In this example, the SRLG list for the primary path includes hierarchized SRLG information of the network elements forming the primary path. For example, the hierarchized SRLG information may include SRLG values and severity values, as depicted in FIG. 7. The hierarchized SRLG information may be designated in the format depicted in FIGS. 11A-11C. The hierarchized SRLG information selected from the SRLG list for the primary path is stored in a variable Pri_SRLG.

In S13, a variable Longest_Match indicating a greatest matched mask length is initialized and set to zero. A matched mask length indicates the length of a region for which an SRLG value corresponding to a network element of the primary path and an SRLG value corresponding to a network element of the protection path continuously match each other.

In S14, the detector 11 selects a hierarchized SRLG from an SRLG list for the protection path. In particular, the detector 11 selects one of the network elements forming the protection path and acquires hierarchized SRLG information corresponding to the selected network element. In this example, the SRLG list for the protection path includes hierarchized SRLG information of the network elements forming the protection path. The hierarchized SRLG information selected from the SRLG list for the protection path is stored in a variable Pro_SRLG.

In S15, the detector 11 detects a matched mask length Matched_Mask between the SRLG value selected in S12 for the primary path and the SRLG value selected in S14 for the protection path. In S16, the detector 11 compares the matched mask length Matched_Mask detected in S15 with the greatest matched mask length Longest_Match. When the matched mask length Matched_Mask detected in S15 is greater than the greatest matched mask length Longest_Match, the detector 11 stores, in S17, the matched mask length detected in S15 in the variable Longest_Match.

In S18, the detector 11 decides whether the processes of S15-S17 have been performed for all of the hierarchized SRLGs in the SRLG list for the protection path. When there remains a hierarchized SRLG for which the processes of S15-S17 have not been performed, the process of the detector 11 returns to S14. Thus, a greatest matched mask length is detected between an SRLG value corresponding to one of the network elements forming the primary path and the SRLG values corresponding to the network elements forming the protection path. Then, the processes of S21-S27 and S31-S36 are performed for a bit string for which the greatest matched mask length has been detected.

In S21, the calculator 12 initializes and sets a variable Longest_Type indicating a greatest type matched length to zero. A type matched length indicates the length of a region in a 32-bit SRLG value in which type information is stored.

In S22, the calculator 12 initializes and sets a variable Violation_Cost indicating a severity to zero. Note that the variable Violation_Cost indicates a severity corresponding to a type specified through S21-S26.

In S23, the calculator 12 selects hierarchized SRLG information from a hierarchized SRLG database. For example, the hierarchized SRLG information may include an SRLG type, a type mask, the number of classes, and class details, as depicted in FIGS. 11A-11C. The selected hierarchized SRLG information is stored in a structure variable Hsrlg.

In S24, the calculator 12 decides whether a mask section of the Longest_Match can be a type in the hierarchized SRLG information selected in S23. In particular, it is decided whether the length of the mask section of the Longest_Match is greater than or equal to a member "Type-Mask" in the hierarchized SRLG information selected in S23 (structure variable Hsrlg). When the length of the mask section of the Longest_Match is greater than or equal to "Type_Mask", the process of the calculator 12 shifts to S25.

In S25, the calculator 12 decides whether the member "TypeMask" in the piece of hierarchized SRLG information selected in S23 (structure variable Hsrlg) is the most detailed among the types in the pieces of hierarchized SRLG information selected up to the present. In particular, it is decided whether the "TypeMask" in the hierarchized SRLG information selected in S23 is greater than Longest_Type. When the "TypeMask" is greater than Longest_Type, the process of the calculator 12 shifts to S26.

In S26, the calculator 12 decides whether the type in the hierarchized SRLG selected in S12 for the primary path matches the type in the hierarchized SRLG information selected in S23. When these types match each other, the calculator 12 updates, in S27, the variable Longest_Type indicating the greatest type matched length to the "Type-Mask" in the hierarchized SRLG information selected in S23 (structure variable Hsrlg).

As described above, through S21-S27, the most detailed type is specified for a bit string for which the greatest matched mask length has been detected. Thus, a type represented with the longest bit string is specified. When the decision is "No" in any one of S24-S26, the process of the calculator 12 shifts to S37.

In S31, the calculator 12 initializes and sets a variable Violation_Cost indicating a severity to zero. The variable Violation_Cost indicates a severity corresponding to the type specified through S21-S27.

In S32, the calculator 12 selects information corresponding to one class from the hierarchized SRLG information selected in S23. The information corresponding to one class includes a class mask and a severity (i.e., Class Mask and Class Severity), as depicted in FIGS. 11A-11C. The selected information is stored in a structure variable Harlg_Class.

In S33, the calculator 12 decides whether the greatest matched mask length Longest_Match obtained through S12-S18 is greater than or equal to the mask length of the class selected in S32. When, for example, class #1 is selected in the example depicted in FIG. 11B, it is decided whether the greatest matched mask length is greater than or equal to 16 bits. When the greatest matched mask length is greater than or equal to the mask length of the selected class, the process of the calculator 12 shifts to S34.

In S34, the calculator 12 decides whether the severity of the class selected in S32 is greater than the variable Violation_Cost. When the severity of the class selected in S32 is the greatest among the classes selected up to the present, the calculator 12 updates the variable Violation_Cost in S35. In particular, the variable Violation_Cost is updated to the severity of the class selected in S32.

In S36, the calculator 12 decides whether the processes of S33-S35 have been performed for all of the classes in the hierarchized SRLG information selected in S23. When there remains a class for which the processes of S33-S35 have not been performed, the process of the calculator 12 returns to S32. Accordingly, the processes of S33-S35 will be performed for all of the classes in the hierarchized SRLG information selected in S23.

Assume that the greatest matched mask length between an SRLG value corresponding to one of the network elements forming a primary path and SRLG values corresponding to the network elements forming a protection path is 25 bits and that the hierarchized SRLG information depicted in FIG. 11B has been obtained. In this case, the greatest matched mask length is greater than the mask length of class #2 and less than the mask length of class #3. Accordingly, a severity of "20" corresponding to class #2 is obtained as a variable Violation_Cost indicating the greatest severity.

In S37, the calculator 12 decides whether the processes of S24-S27 and S31-S36 have been performed for all pieces of hierarchized SRLG information in the hierarchized SRLG database from S23. When there remains a piece of hierarchized SRLG information for which the processes of S24-S27 and S31-S36 have not been performed, the process of the calculator 12 returns to S23. Thus, the calculator 12 will perform the processes of S24-S27 and S31-S36 for all pieces of hierarchized SRLG information. As a result, the greatest severity will be obtained. Note that the severity obtained through the processes of S24-S27 and S31-S36 indicates the greatest severity for one of the network elements forming the primary path.

In S41, the greatest severity obtained by performing the processes of S24-S27 and S31-S36 is added to the variable Cumulative_Cost indicating the cumulative cost.

In S42, the network control device 1 decides whether the processes of S13-S18, S21-S27, S31-S37, and S41 have been performed for all of the hierarchized SRLGs in the SRLG list for the primary path. When there remains a hierarchized SRLG for which the processes of S13-S18, S21-S27, S31-S37, and S41 have not been performed, the process of the network control device 1 returns to S12. Thus, the network control device 1 performs the processes of S13-S18, S21-S27, S31-S37, and S41 for each of the hierarchized SRLGs corresponding to the network elements forming the primary path. As a result, a largest severity value is calculated for each of the network elements of the primary path between the source node and the destination node, and the sum of the largest severity values is also calculated. This sum indicates a cumulative SRLG violation cost on the paths between the source node and the destination node.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A network system that includes a network configured by a plurality of network elements and a network control device configured to control the network, wherein
the network control device comprising:
a storage that stores an identifying value and a severity value for each of the network elements of the network, the identifying values being hierarchized based on inclusion relationships between the network elements, the severity values each indicating a severity in sharing a risk of a failure occurrence in each of the network elements; and a processor that evaluates, when a first path and a second path that respectively connect a source node and a destination node are designated, the second path with respect to the first path, wherein
the processor performs
- a first process to obtain N identifying values corresponding to N network elements that configure the first path and K identifying values corresponding to K network elements that configure the second path from the identifying values stored in the storage,
- a second process to select one identifying value from the N identifying values,
- a third process to detect an identifying value that has a longest region in which a value of bits being equal to a value of bits in the identifying value selected in the second process from the K identifying values,
- a fourth process to perform the second process and the third process for each of remaining identifying values in the N identifying values,
- a fifth process to calculate a sum of severity values corresponding to the identifying values detected in the second process to the fourth process, and
- a sixth process to decide that the second path is not appropriate to be used as a protection path for the first path when the sum calculated in the fifth process is larger than a specified upper limit, wherein
when the sum calculated in the fifth process does not exceed the specified upper limit, the network control device configures the first path and the second path between the source node and the destination node in the network.

2. The network system according to claim 1, wherein
when the first path, the second path, and a third path that respectively connect the source node and the destination node are designated,
the processor calculates a first total value indicating a sum of severity values between the first path and the second path and calculates a second total value indicating a sum of severity values between the first path and the third path, and
the processor compares the first total value and the second total value in accordance with a specified evaluation policy so as to determine which of the second path or the third path is appropriate to be used as a protection path for the first path.

3. The network system according to claim 1, wherein
when a second network element is included in a first network element that is provided on the first path or the second path, the identifying value of the first network element includes a first value and the identifying value of the second network element includes the first value and a second value.

4. The network system according to claim 3, wherein
a severity value corresponding to the identifying value of the second network element is larger than a severity value corresponding to the identifying value of the first network element.

5. The network system according to claim 1, wherein
the identifying value of a first network element that is provided on the first path or the second path includes type information of the first network element and a first value, the type information indicating a type of network elements, and
the identifying value of a second network element that is included in the first network element includes the type information of the first network element, the first value, and a second value.

6. The network system according to claim 5, wherein
a severity value corresponding to the identifying value of the first network element and a severity value corresponding to the identifying value of the second network element are set in association with the type information.

7. A method performed by a network control device to configure a path in a network wherein
the network control device includes
- a storage that stores an identifying value and a severity value for each of network elements of the network, the identifying values being hierarchized based on inclusion relationships between the network elements, the severity values each indicating a severity in sharing a risk of a failure occurrence in each of the network elements; and
- a processor that evaluates, when a first path and a second path that respectively connect a source node and a destination node are designated, the second path with respect to the first path, wherein
the processor performs
- a first process to obtain N identifying values corresponding to N network elements that configure the first path and K identifying values corresponding to K network elements that configure the second path from the identifying values stored in the storage,
- a second process to select one identifying value from the N identifying values,
- a third process to detect an identifying value that has a longest region in which a value of bits being equal to a value of bits in the identifying value selected in the second process from the K identifying values,
- a fourth process to perform the second process and the third process for each of remaining identifying values in the N identifying values,
- a fifth process to calculate a sum of severity values corresponding to the identifying values detected in the second process to the fourth process, and
- a sixth process to decide that the second path is not appropriate to be used as a protection path for the first path when the sum calculated in the fifth process is larger than a specified upper limit, wherein
when the sum calculated in the fifth process does not exceed the specified upper limit, the network control device configures the first path and the second path between the source node and the destination node in the network.

* * * * *